April 20, 1954     E. VAN POOLEN     2,675,953
MACHINE FOR REMOVING LIDS FROM PULLMAN BREAD PANS
Filed Aug. 29, 1951
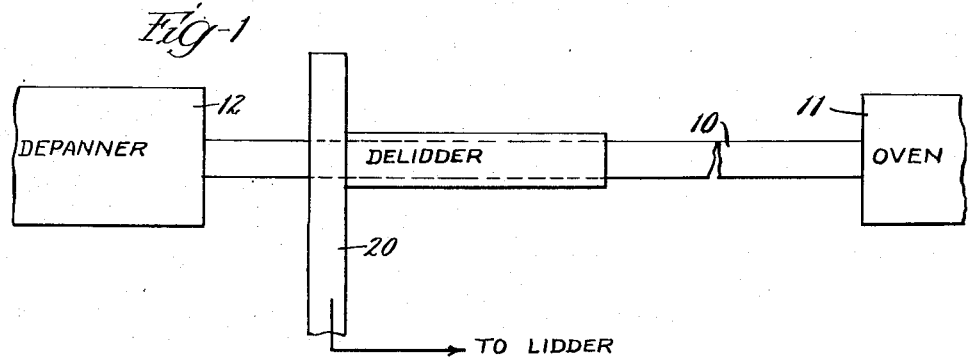
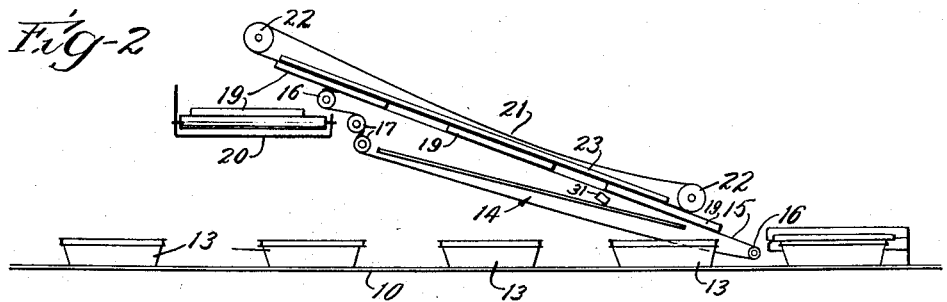
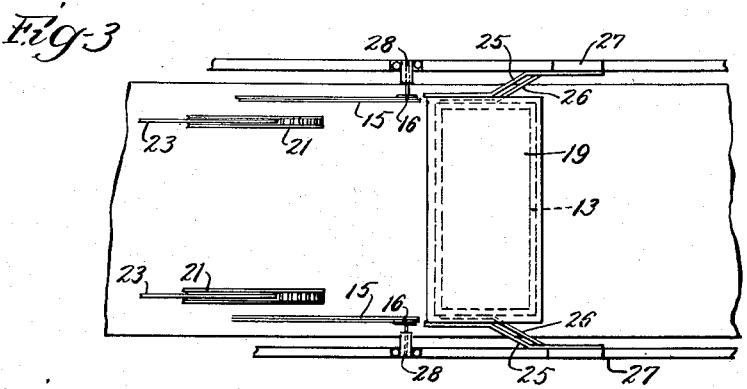
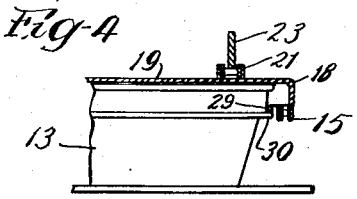
INVENTOR.
Edward Van Poolen
BY
Mann, Brown and Hausmann
Attys.

Patented Apr. 20, 1954

2,675,953

UNITED STATES PATENT OFFICE 2,675,953

MACHINE FOR REMOVING LIDS FROM PULLMAN BREAD PANS

Edward Van Poolen, Cicero, Ill., assignor to The W. E. Long Company, a corporation of Illinois Application August 29, 1951, Serial No. 244,243

5 Claims. (Cl. 226—129)

This invention relates to machines for removing lids from Pullman bread pans, and has for its principal object to provide mechanism for lifting the lids from the bread pans as they travel toward a depanning station, and to convey the lids to a suitable place for re-use, such as a re-lidding station.

Generally speaking, this is accomplished by providing a conveyor or conveyors running at an angle to a stream of pans in position to pass beneath overhanging portions of the lids, lift them from the pans, and carry them away.

Further objects and advantages of the invention will appear as the disclosure proceeds and the description is read in connection with the accompanying diagrammatic drawings, in which Fig. 1 is a plan view of an oven, a depanner, a conveyor running between them, and a machine embodying the present invention;

Fig. 2 is an enlarged side elevation showing the machine embodying this invention above and inclining away from the stream of pans on the conveyor running between the oven and the depanner;

Fig. 3 is a plan view of a portion of Fig. 2 illustrating the arrangement of the machine over the pan conveyor and showing centering guides for bringing the pans and lids into proper position for the lid removing operation;

Fig. 4 is a sectional view showing how the lid lifting conveyor passes under the overhanging ledge of the pan and the associated pressure device holds the lid down on the conveyor.

In these drawings, 10 indicates a pan conveyor running between an oven 11 and a depanner 12. It is shown here as being continuous and straight, but many times will be otherwise. It serves to take a stream of bread pans or pan sets 13 from the oven to the depanner.

The machine embodying this invention as here disclosed includes a conveyor, generally indicated by 14 and composed of an endless chain or belt 15 running around suitable guide or idler pulleys 16 and 17.

As shown best in Figs. 2 and 4, a chain or belt 15 is in a position to run beneath the overhanging edge or end portion 18 of pan lid 19, and thus lift it off the pan 13, carry it upwardly away from the stream of pans, and deliver it to a suitable conveyor chute 20.

In this diagrammatic illustration, there are two chains or belts 15, one at each side, so spaced as to run under the overhanging edges 18 of the pan. They may be considered as separate conveyors or as a single conveyor, but they are driven in unison and operate simultaneously.

In order to hold the pan lids on the conveyor 15 and insure that they go upwardly with it to the conveyor 20, there is a pressure belt or chain 21 running around pulleys 22 and underneath a pressure board 23, spring loaded to urge the lower run of the belt 21 downwardly against the pan lids 19. In effect, this arrangement makes the pan lifting conveyor and the pressure belt grasp the lids, and take them in series from the stream of pans on the conveyor 10 to the take-away conveyor 20.

Adjacent to the lower end of the lid lifting conveyor there are two sets of guide fingers 25 and 26, one above the other and spaced laterally, the upper serving to center the lids 19 and the lower serving to center the pans 13 on the pan conveyor as they approach the lid removing machine substantially as shown in Figs. 2 and 3. In this diagrammatic illustration, the guides are shown as angular pieces of resilient material secured to side frames 27, which also serve to support the shafts 28 of the lid lifting conveyor.

It will sometimes be found desirable to provide means for holding the pans 13 down on the conveyor 10 so that they will not be carried up with the lids. This is easily accomplished by fingers 29 (Fig. 4) extending above the pan flanges 30 as the pans approach or reach lid lifting positions indicated in Figs. 2, 3 and 4.

As best appears in Fig. 4, the flanges 30 are formed on the pans below the bottom edges of the overhanging end portions 18 of the lids 19, so that the fingers 29, which can be fixed relatively to the frame or support on which the conveyors are mounted, can be positioned to engage the tops of the pan flanges and be clear of the belts or chains 15 when fit under lid edges to lift the lids.

It will also be desirable to introduce safety devices to give a signal when a pan lid gets crooked or the lid is so pinched onto the pan as to prevent prompt removal. Such a device may include a switch or switches 31 in position to be engaged by a misplaced lid or a pan that does not properly release, and thus close a circuit, giving a light or audible signal, or both.

As here shown, the conveyor belts or chains 15 run under the overhanging edges of the pans, but they may be arranged to one side and carry suitable lifting fingers to run under the overhanging edges of the pans.

In bakeries where the size of the pan is changed frequently, the machine will have the conveyors 14, and possibly also the pressure belt, arranged on screws or other means to provide for lateral adjustment.

I claim:
1. In a machine for removing lids from Pullman bread pans, a fixed frame, a pair of conveyors mounted thereon including a first conveyor for moving lidded pans, a second conveyor extending above and at an angle to the first conveyor having a leading end portion adapted to extend under the overhanging edges of lids on pans on the first conveyor and lift them from the pans, and guide means for centering the lidded pans on the first conveyor for engagement of the lids by the leading end portion of the second conveyor comprising finger means operatively connected to the fixed frame.

2. In a machine for removing lids from Pullman bread pans, a fixed frame, a pair of conveyors mounted thereon including a substantially horizontal conveyor for moving lidded pans, an upwardly inclined conveyor positioned over the horizontal conveyor having a leading end portion adapted to extend under the overhanging edges of lids on pans on the horizontal conveyor and lift them from the pans, and guide means for centering the lidded pans on the horizontal conveyor for engagement of the lids by the leading end portion of the inclined conveyor comprising finger means operatively connected to the fixed frame.

3. In a machine for removing lids from Pullman bread pans, a fixed frame, a pair of conveyors mounted thereon including diverging lower and upper conveyors in the same vertical plane spaced vertically at the leading edge of the upper conveyor so that the lids of lidded pans advancing on the lower conveyor will be caught above the advancing run of the upper conveyor and be lifted from the pans, and guide means for centering the lidded pans on the lower conveyor for engagement of the lids by the leading edge of the upper conveyor comprising resilient finger means connected to the fixed frame.

4. In a machine for removing lids from Pullman bread pans, a first conveyor for moving lidded pans, a second conveyor extending above and at an angle to the first conveyor having a leading end portion adapted to extend under the overhanging edges of lids on pans on the first conveyor and lift them from the pans, endless flexible pressure means having a leading end behind the leading end portion of the second conveyor and a run parallel to the second conveyor for cooperating therewith to grasp the lifted lids and hold them on the second conveyor, and holddown means adjacent to the first conveyor for engaging portions of the pans beneath the lids and holding the pans on the first conveyor during lifting of the lids therefrom.

5. In a machine for removing lids from Pullman bread pans, a first conveyor for moving lidded pans, a second conveyor extending above and at an angle to the first conveyor having a leading end portion adapted to extend under the overhanging edges of lids on pans on the first conveyor and lift them from the pans, endless flexible pressure means having a leading end behind the leading end portion of the second conveyor and a run parallel to the second conveyor for cooperating therewith to grasp the lifted lids and hold them on the second conveyor, guide means adjacent to the first conveyor and in advance of the leading end portion of the second adapted to engage advancing lidded pans for aligning the edges of the lids thereof with the second conveyor, and holddown means adjacent to the first conveyor for engaging portions of the pans beneath the lids and holding the pans on the first conveyor during lifting of the lids therefrom.

References Cited in the file of this patent
UNITED STATES PATENTS

| Number | Name | Date |
|---|---|---|
| 890,292 | Monette | June 9, 1908 |
| 1,119,205 | Van Houten | Dec. 1, 1914 |
| 1,127,113 | Thiemann | Feb. 2, 1915 |
| 1,306,477 | Frey | June 10, 1919 |